(12) United States Patent
Shanmugam et al.

(10) Patent No.: US 9,906,969 B2
(45) Date of Patent: Feb. 27, 2018

(54) REMOTE DIAGNOSTICS FOR MOBILE DEVICES

(71) Applicant: CELLCO PARTNERSHIP, Basking Ridge, NJ (US)

(72) Inventors: Sankar Shanmugam, Dayton, NJ (US); Petri Virkkula, Kendall Park, NJ (US); Gayathri Chandrasekaran, Somerset, NJ (US); Ying Sun, Hudson, OH (US); Brian Matthew White, Port Murray, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1000 days.

(21) Appl. No.: 14/245,318

(22) Filed: Apr. 4, 2014

(65) Prior Publication Data

US 2015/0289152 A1 Oct. 8, 2015

(51) Int. Cl.
  *H04W 24/06* (2009.01)
  *H04W 24/08* (2009.01)
  *H04L 12/26* (2006.01)
  *H04W 24/04* (2009.01)

(52) U.S. Cl.
  CPC .......... *H04W 24/06* (2013.01); *H04L 43/50* (2013.01); *H04W 24/04* (2013.01); *H04W 24/08* (2013.01)

(58) Field of Classification Search
  CPC ..... H04W 24/04; H04W 24/06; H04W 24/08; H04W 24/00; H04W 12/06; H04W 12/08; H04L 12/24; H04L 43/0817; H04L 43/50; H04L 63/083
  See application file for complete search history.

(56) References Cited

U.S. PATENT DOCUMENTS

| 7,200,651 | B1* | 4/2007 | Niemi | G06F 8/65 709/223 |
| 9,009,769 | B2* | 4/2015 | Kesireddy | H04N 7/173 348/180 |
| 2004/0210450 | A1* | 10/2004 | Atencio | G06Q 40/12 705/30 |
| 2006/0094400 | A1* | 5/2006 | Beachem | H04L 63/101 455/410 |

(Continued)

FOREIGN PATENT DOCUMENTS

WO    WO 2008022291 A2 *  2/2008  ......... H04L 41/0816

*Primary Examiner* — Magdi Elhag

(57) ABSTRACT

Systems and methods for remote diagnostics are disclosed. In some implementations, a request for a device diagnostic session is provided from a mobile device to a diagnostic server. In response to the request, a messaging service message from the diagnostic server may be received at the mobile device. The messaging service message may include an authentication token. Upon receipt of the messaging service message including the authentication token, a diagnostic client resident at the mobile device may be initialized. Upon authenticating the authentication token included in the received messaging service message, a secure connection for the device diagnostic session may be established between the diagnostic server and the initialized diagnostic client. Diagnostic commands may be received at the diagnostic client from the diagnostic server via the established secure connection. The diagnostic commands may cause the diagnostic server to retrieve device diagnostics of the mobile device.

20 Claims, 9 Drawing Sheets

(56) References Cited

U.S. PATENT DOCUMENTS

| | | | |
|---|---|---|---|
| 2008/0091815 A1* | 4/2008 | Rao | G06F 8/65 709/223 |
| 2014/0044123 A1* | 2/2014 | Lawson | H04L 65/1023 370/352 |
| 2015/0095404 A1* | 4/2015 | Perlman | H04L 67/1034 709/203 |

* cited by examiner

| Data Type | 10/3/2013, 1:47 pm | ▼ |
|---|---|---|
| Device Module SKU | Galaxy Nexus | |
| Root Detection | NO | |
| Network | LTE | |
| Signal Strength | | |
| 4G | -93 dBm | |
| 3G | -85 dBm | |
| 1x | -75 dBm | |
| Wi-Fi | -9999 dBm | |
| Battery | | |
| Health | GOOD | |
| Percentage | 13% | |
| Voltage | 3807 mV | |
| Temperature | 86 F / 30 C | |
| Version | | |
| OS Version | 4.2.2 | |
| Linux Kernel Version | 3.0.31-g9f818de | |
| SIM State | READY | |
| Roaming | NO | |
| Country | US | |

*FIG. 5B*

| PERMISSIONS | USER ROLE |
|---|---|
| Basic Read Only<br>○ Tier 1 Customer Service, Retail<br>○ Read Past Diagnostics<br>○ Read and Compare History | Read_Only (1) |
| Complete Diagnostics/No MDN Search<br><br>○ Default role for Customer Care Tier 2 Technicians<br>○ Full access to read Diagnostics, remote history and compare.<br>○ Ability to initiate a diagnostic session and retrieve detailed diagnostics.<br>○ Access only to the MDN that is passed via ACSS or other application. | Diagnostics (2) |
| Search Diagnostic History<br><br>○ Ability to perform an MDN search<br>○ Full access to read Diagnostics and compare.<br>○ Cannot initiate a diagnostics session or retrieve diagnostics data | Search_History (3) |
| Full Access –<br>○ Full access to read Diagnostics, remote history and compare.<br>○ Ability to initiate a diagnostic session and retrieve detailed diagnostics.<br>○ Ability to perform an MDN search | Full_Access (4) |

*FIG. 6*

REMOTE DIAGNOSTICS FOR MOBILE DEVICES

BACKGROUND

In recent years, smartphone and mobile device use has increased tremendously. While smartphone user interfaces are generally considered to be intuitive, users may find it challenging to self-troubleshoot issues. Such issues may include, for example, technical or hardware level issues such as mobile device memory performance, battery, etc. To resolve such issues, users may often call a customer service agent associated with a wireless network provider. The customer service agent may use a diagnostic method or tool to help diagnose and resolve these issues. These tools are generally specific to a mobile device manufacturer and provided to the wireless network provider by the mobile device manufacturer. Therefore, the customer service agent may need to use different diagnostic tools for mobile devices manufactured by different manufacturers. Consequently, the customer service agent's efficiency may be reduced.

Some third-party diagnostic tools may allow initiation of a "screen sharing" session between a user of a mobile device and the customer service agent to help the user resolve mobile device issues. However, with screen sharing, the user and the customer service agent typically experience long average setup times and average call durations during the screen sharing session. Furthermore, a high volume of data may be exchanged during such sessions between the user's mobile device and a client device of the customer service agent. This increases bandwidth needed to support the customer service session with the user. Additionally, to support screen sharing, mobile devices may need to be configured at an operating system level by a manufacturer of the mobile device.

Diagnostic solutions may also require integrating the solutions into operating systems of mobile devices during manufacturer design and manufacturing process cycles. Such cycles may be generally initiated once every several months. As a result, any new diagnostic solutions may not be supported by previously manufactured devices that are presently in use.

As the foregoing illustrates, a new approach for mobile device diagnostics may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5B illustrates an exemplary interface where a device related issue is highlighted.

FIG. 6 illustrates exemplary permissions associated with different customer service roles according to some implementations.

DETAILED DESCRIPTION

Figure 1:
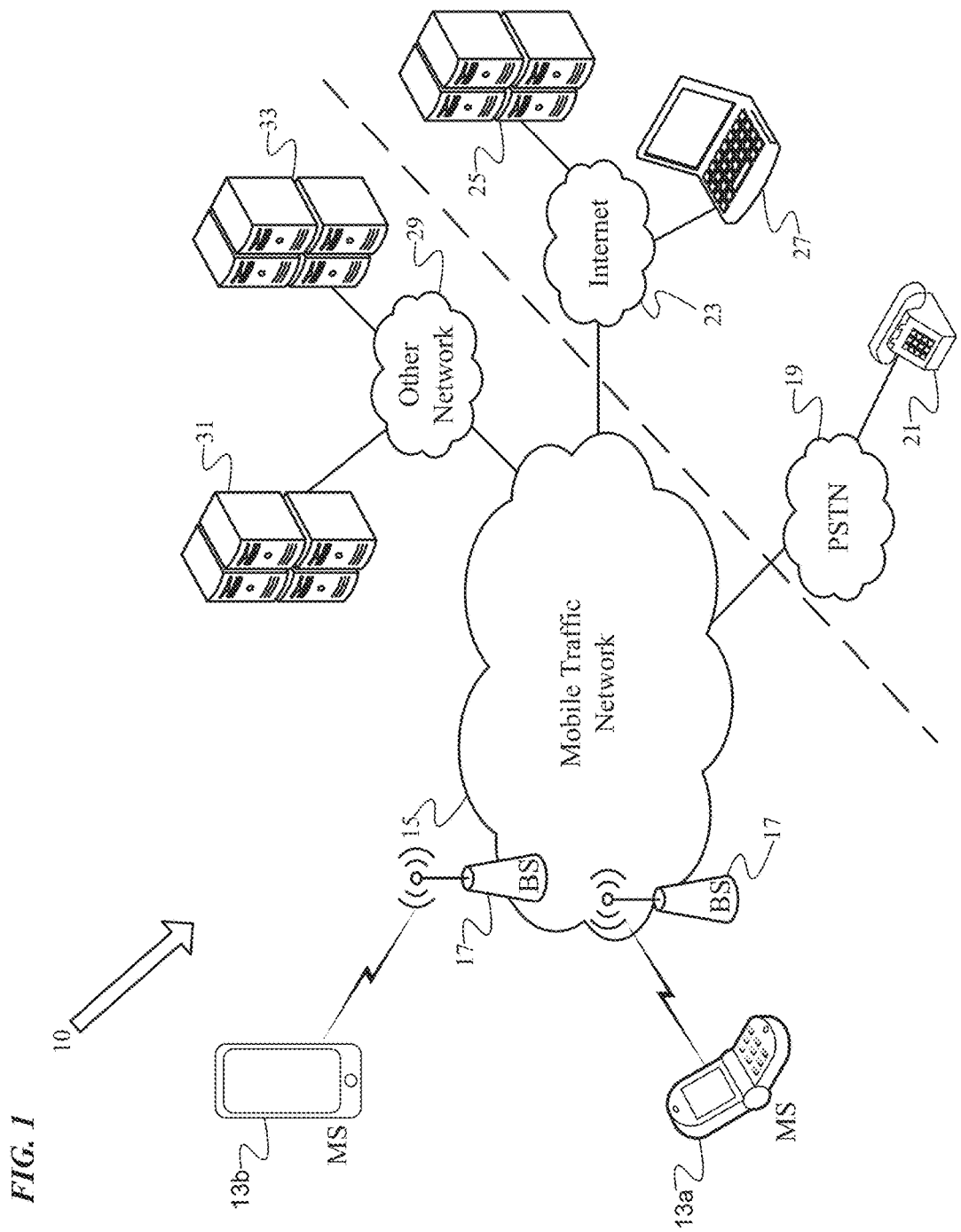
FIG. 1 is a high-level functional block diagram of an example of a system of networks/devices that provide various communications for mobile stations and support an example of a remote diagnostic service.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various implementations disclosed herein relate to remote diagnostics for mobile devices. Customer service agents may use different diagnostic methods or tools to help users diagnose and resolve mobile device issues. These tools are generally specific to a mobile device manufacturer and provided to the wireless network provider by the mobile device manufacturer. This is disadvantageous because customer service agents may need to use different diagnostic tools for different mobile devices manufactured by different manufacturers. For example, the Apple's Global Service Exchange (GSX) diagnostic tool may work only with Apple's iOS devices and may require explicit user authorization for every diagnostic session.

As noted above, some third party diagnostic tools allow initiation of a screen sharing session between a user of a mobile device and a customer service agent to help the user resolve mobile device issues. However, customer service agents and users typically experience long average setup times and average call durations during such screen sharing sessions. Furthermore, a high volume of data may be exchanged during such sessions between the user's mobile device and a client device of the customer service agent. Additionally, mobile devices may need to be configured at an operating system level to support screen sharing. For example, a solution provided by a third party vendor may work on an Android platform while relying on sharing a phone's screen and emulating touch actions by customer service agents from a remote device. While this solution may enable remote troubleshooting, the average setup time and the average call handle times are dramatically high due to the high volume of data that needs to flow between the phone and a browser of a customer service agent. A device serviced under such a screen sharing solution may need to be ported (e.g., specially configured) to integrate with a remote controlled touch emulation solution relying on private or proprietary Application Programming Interfaces (APIs) that may need to be changed by make, model, and operating system version of the device.

Diagnostic solutions may also require integrating the solutions into operating systems of mobile devices during manufacturer design and manufacturing process cycles. Such cycles may be generally initiated once every several months. As a result, any new diagnostic solutions may not be supported by previously manufactured devices in use. For example, tools utilizing Open Mobile Alliance Device Management (OMADM) solutions may require close integration with the Original Equipment Manufacturer (OEM) and a typical OEM implementation cycle, for example, may be generally initiated once every 6-8 months. As a result, any new diagnostic solutions may not be supported, for example, by devices that may be 6-8 months or older. The disclosed implementations provide for a mobile device diagnostic solution that can be, for example, quick to initiate, intuitive and extensible across different mobile device platforms.

In some implementations, a request for a device diagnostic session is provided from a mobile device to a diagnostic server. The request may be provided to the diagnostic server to service a customer service need of a user of the mobile device. In response to the request, a messaging service message from the diagnostic server may be received at the mobile device. The messaging service message may include an authentication token. Upon receipt of the messaging service message including the authentication token, a diagnostic client resident at the mobile device may be initialized. Upon authenticating the authentication token included in the received messaging service message, a secure connection for the device diagnostic session may be established between the diagnostic server and the initialized diagnostic client.

One or more diagnostic commands may be received at the diagnostic client from the diagnostic server via the established secure connection. The diagnostic commands may cause the diagnostic server to retrieve device diagnostics of the mobile device. The device diagnostics may include, but are not limited to, at least one of device hardware status, device application status or device process status. The retrieved device diagnostics may be provided to the diagnostic server using the initialized diagnostic client via the established secure connection. The diagnostic server may provide the device diagnostics for display to a customer service agent servicing the customer service need of the user during the device diagnostic session.

Reference now is made in detail to the examples illustrated in the accompanying drawings and discussed below.

FIG. 1 illustrates a system 10 offering a variety of mobile communication services, including communications for remote diagnostics of mobile stations. The example shows simply two mobile stations (MSs) 13a and 13b as well as a mobile communication network 15. The mobile stations 13a and 13b are examples of mobile stations that may be used for the remote diagnostic service. However, the network will provide similar communications for many other similar users as well as for mobile devices/users that do not participate in the remote diagnostic service. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, Long Term Evolution (LTE) standard, a time division multiple access (TDMA) standard or other standards used for public mobile wireless communications. The mobile stations 13 are capable of voice telephone communications through the network 15, and for the remote diagnostic services, the exemplary mobile stations 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks. The mobile stations 13a and 13b and users of the remote diagnostic service also can receive and execute applications written in various programming languages, as discussed more later.

Mobile stations 13 can take the form of portable handsets, smart-phones or personal digital assistants, although they may be implemented in other form factors. Program applications, including an application to assist in the remote diagnostic service can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serve mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more diagnostic servers 31 and a related authentication server 33 for the application service of server 31.

A mobile station 13 communicates over the air with a base station 17 and through the traffic network 15 for various voice and data communications, e.g. through the Internet 23 with a server 25 and/or with diagnostic servers 31. If the mobile service carrier offers the remote diagnostic service, the service may be hosted on a carrier operated diagnostic servers 31, for communication via the networks 15 and 29. Alternatively, the remote diagnostic service may be provided by a separate entity (alone or through agreements with the carrier), in which case, the service may be hosted on an application server such as server 25 connected for communication via the networks 15 and 23. Server such as 25 and 31 may provide any of a variety of common application or service functions in support of or in addition to an application program running on the mobile station 13. However, for purposes of further discussion, we will focus on functions thereof in support of the mobile remote diagnostic service. For a given service, including the remote diagnostic service, an application program within the mobile station may be considered as a 'client' and the programming at 31/25 may be considered as the 'server' application for the particular service.

To insure that the application service offered by diagnostic server 31 is available to only authorized devices/users, the provider of the application service also deploys an authentication server 33. The authentication server 33 could be a separate physical server as shown, or authentication server 33 could be implemented as another program module running on the same hardware platform as the diagnostic server 31. Essentially, when the server application (server 31 in our example) receives a service request from a client application on a mobile station 13, the server application provides appropriate information to the authentication server 33 to allow authentication server 33 to authenticate the mobile station 13 as outlined herein. Upon successful authentication, the server 33 informs the diagnostic server 31, which in turn provides access to the service via data communication through the various communication elements (e.g. 29, 15 and 17) of the network 10. A similar authentication function may be provided for remote diagnostic service(s) offered via the server 25, either by the server 33 if there is an appropriate arrangement between the carrier and the operator of server 24, by a program on the server 25 or via a separate authentication server (not shown) connected to the Internet 23.

The enhanced remote diagnostic service under consideration here may be delivered to touch screen type mobile stations as well as to non-touch type mobile stations. Hence, our simple example shows the mobile station (MS) 13a as a non-touch type mobile station and shows the mobile station (MS) 13b as a touch screen type mobile station. Implementation of the remote diagnostic service will involve at least some execution of programming in the mobile stations as well as implementation of user input/output functions and data communications through the network 15, from the mobile stations.

Those skilled in the art presumably are familiar with the structure, programming and operations of the various types of mobile stations. However, for completeness, it may be useful to consider the functional elements/aspects of two exemplary mobile stations 13a and 13b, at a high-level.

Figure 2:
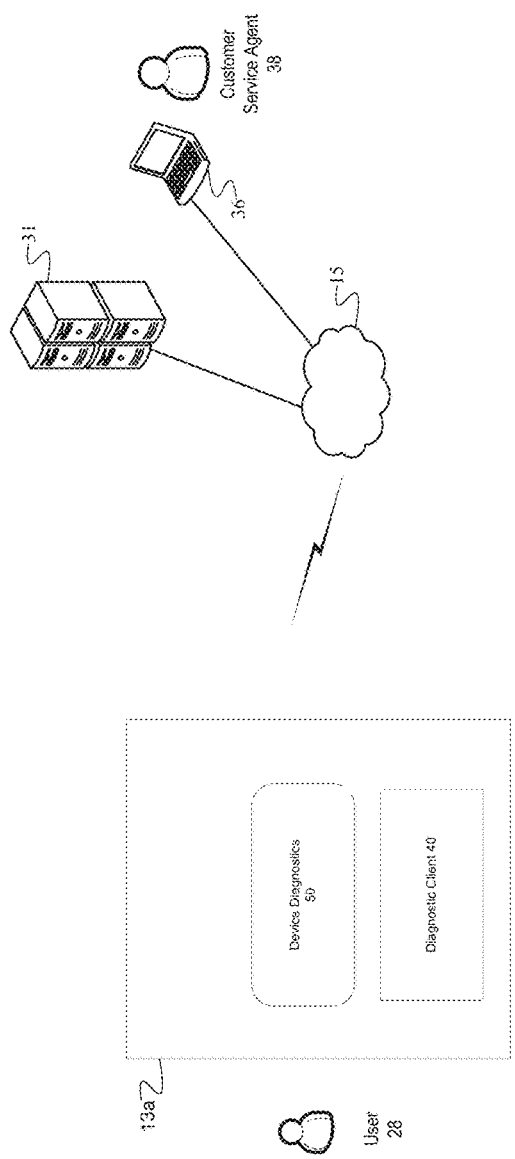
FIG. 2 is a high-level functional block diagram illustrating exemplary communications between particular components of FIG. 1.

FIG. 2 illustrates a functional block diagram including mobile station 13a, user 28, diagnostic server 31, customer service client 36 and customer service agent 38. Mobile station 13a can further include diagnostic client 40 and device diagnostics 50. Diagnostic client 40 and device diagnostics 50 are discussed further below.

In some implementations, a request for a device diagnostic session is provided from the mobile station 13a to the diagnostic server 31. The request may be provided to service a customer service need of a user 28 of the mobile station 13a. The request may be provided as a message from the mobile station 13a to the diagnostic server 31 over network 15. As an example, the request may be provided when a user of the mobile station 13a selects a customer service application on the mobile station 13a. In response to the request, a messaging service message from the diagnostic server 31 may be received at the mobile station 13a. The messaging service message may include an authentication token. In some implementations, the authentication token may be unique to a device diagnostic session. Each request for a device diagnostic session provided from the mobile station 13a to the diagnostic server 31 may cause the diagnostic server 31 to generate a different authentication token for inclusion in the messaging service message for the mobile station 13a. In some implementations, an older authentication token from a previous diagnostic session may be deleted after a predetermined amount of time by the mobile station 13a. In other implementations, an authentication token from an earlier terminated diagnostic session may be overwritten at the mobile station 13a by a new authentication token associated with a current diagnostic session.

Upon receipt of the messaging service message including the authentication token, a diagnostic client 40 resident at the mobile station 13a may be initialized. In some implementations, the diagnostic client 40 may validate the authentication token against a table of valid authentication token values prior to initializing operation. In some implementations, the diagnostic client 40 may compute a hash value from the authentication token and validate the computed hash value against a set of valid hash values prior to initializing operation. Upon authenticating the authentication token included in the received messaging service message, a secure connection for the device diagnostic session may be established between the diagnostic server 31 and the initialized diagnostic client 40 at the mobile station 13a. The secure connection can be, for example, a Hypertext Transfer Protocol Secure (HTTPS) connection for secure communication over a computer network. HTTPS can be a result of layering the Hypertext Transfer Protocol (HTTP) on top of the Transport Layer Security (TLS) or Secure Sockets Layer (SSL) protocols, thus adding the security capabilities of SSL/TLS to standard HTTP communications. TLS and SSL are cryptographic protocols which are designed to provide communication security over the Internet. This allows for data/message confidentiality.

After authentication of the token, one or more diagnostic commands may be received at the diagnostic client 40 from the diagnostic server 31 via the established secure connection. The diagnostic commands may cause the diagnostic server 31 to retrieve device diagnostics 50 of the mobile station 13a. For example, the diagnostic commands may include one or more instructions to the mobile station 13a. The instructions may instruct a processor of the mobile station 13a to retrieve one or more device diagnostics 50 from the memory of the mobile station 13a. The instructions in the diagnostic commands may then further instruct the mobile station 13a to transmit the device diagnostics 50 to the diagnostic server 31. The device diagnostics 50 may include, but are not limited to, at least one of device hardware status, device application status or device process status. The retrieved device diagnostics 50 may be provided to the diagnostic server 31 using the initialized diagnostic client 40 via the established secure connection. The diagnostic server 31 may provide the device diagnostics for display to a customer service agent 38 via customer service client 36 servicing the customer service need of the user 28 during the device diagnostic session. The device diagnostics that are provided for display to the customer service agent 38 may be based on a privilege level of the customer service agent 38. For example, certain supervisory customer service agents 38 may be allowed to view all the diagnostic data 50 received from the mobile station 13a. Other customer service agents may be allowed to view a smaller subset of the diagnostic data 50 received from the mobile station 13a. In some implementations, the customer service client 36 may check a privilege level of the customer service agent 38 from a database of customer service agent parameters and then display the diagnostic data 50 (or a subset thereof) to the customer service agent 38 based on the privilege level.

In some implementations, the diagnostic client 40 can be a My Verizon Mobile Remote Device (MVMD) Diagnostic solution for Android devices. In some implementations, the mobile station 13a may register with the diagnostic server 31. The diagnostic server 31 may remotely "wake up" or initialize the diagnostic client 40 resident at mobile station 13a using Wireless Application Protocol (WAP) push messages or any other messaging service message. The initialized diagnostic client 40 may establish and maintain a persistent secure connection with the diagnostic server 31 so that diagnostic commands may be provided by the customer service agent 38 via customer service client 36 to the mobile station 13a at anytime during a diagnostic session. A webportal or web application may be displayed at customer service client 36 and can display the current diagnostics (e.g., device diagnostics 50) along with any past diagnostics that may have been obtained from mobile station 13a. In some implementations, the customer service client 36 may display an interactive calendar interface that allows the customer service agent 38 to select one or more dates for which the customer service agent 38 wishes to view past diagnostics. Upon receipt of the selection of the one of more dates, the diagnostic server 31 retrieves the past diagnostics from memory and displays the past diagnostics via the customer service client 36. In some implementations, the customer service web application displayed at customer service client 36 and used by the customer service agent 38 may provide a compare feature that allows the customer service agent 38 to compare a current diagnostic session with past diagnostic sessions. Such a comparison performed by diagnostic server 31 may help the customer service agent 38 help troubleshoot new issues since the last diagnostic session with mobile station 13a.

Figure 3:
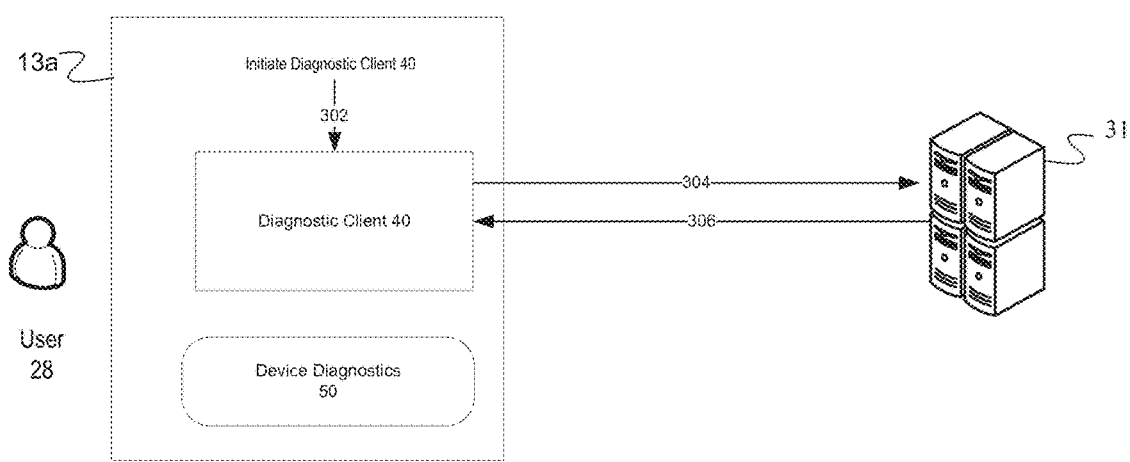
FIG. 3 illustrates an exemplary flow diagram of registration of a mobile station with a diagnostic server.
Figure 4:
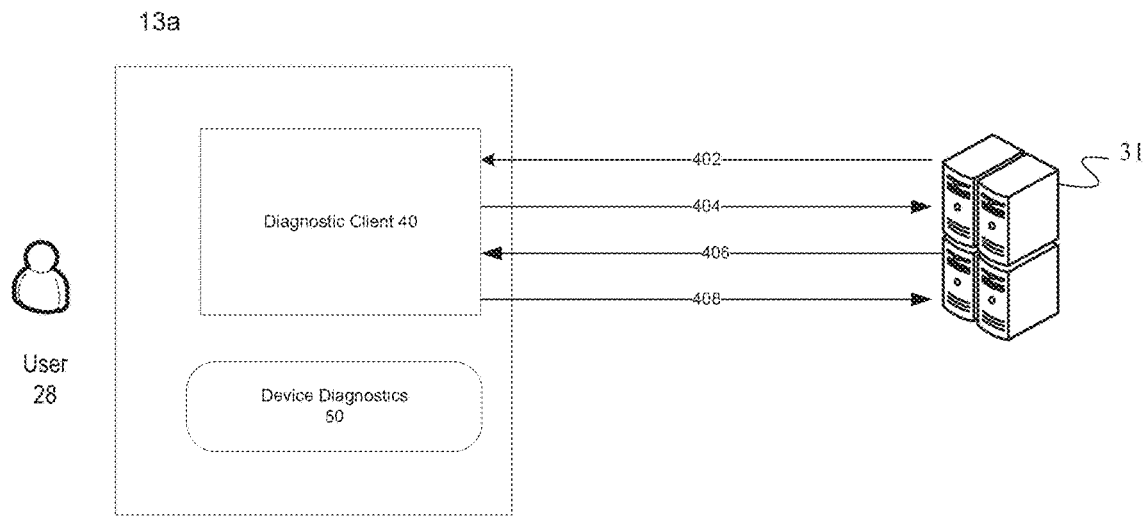
FIG. 4 illustrates an exemplary flow diagram for establishment of a secure communication connection between a mobile station and a diagnostic server.

In some implementations that will be also discussed further with reference to FIGS. 3 and 4, operations performed by the diagnostic server 31 may include, but are not limited to, registering the mobile station 13a in a database when mobile station 13a is rebooted or an outgoing call is made from mobile station 13a by user 28, waking up or initiating diagnostic client 40 by sending a messaging service message (e.g., WAP push message) to mobile station 13a and maintaining a persistent communication connection with mobile station 13a. The registration of the mobile station 13a in the database may include, but is not limited to, storing information uniquely identifying the mobile station 13a. Such information can be a Mobile Device Number (MDN) or a Mobile Equipment Identifier (MEID) of the mobile station 13a. In addition, as will be discussed further below, diagnostic server 31 may pre-fetch diagnostic data 50 during an Interactive Voice Response (IVR) session between user 28 and a customer service support line of a wireless network provider associated with mobile station 13a.

In some implementations, diagnostic server 31 may also store data received from mobile station 13a in a database of diagnostic server 31. The data stored in the database may be compared by the diagnostic server 31 with new diagnostic data that received from mobile station 13a. In some implementations, the diagnostic server 31 may compare the received diagnostic data 50 with previously stored diagnostic data and pro-actively highlight one or more differences determined from the comparison for display in the customer service client 36. In some implementations, diagnostic server 31 can identify critical issues, including, but not limited to, low memory or high CPU utilization. The identified issue(s) may be provided for display in a highlighted format to the customer service agent 38 via customer service client 36. In some implementations, as will be discussed below, diagnostic server 31 provides role-based access control in which access to diagnostic data from mobile station 13a or diagnostic data stored at diagnostic server 31 may be controlled based on an access privilege level of the customer service agent 38.

FIG. 3 illustrates an exemplary flow diagram of registration of mobile station 13a with diagnostic server 31. In step 302, the diagnostic client 40 is initiated. As an example, the diagnostic client 40 may be initiated when mobile station 13a is rebooted or when an outgoing call is made from mobile station 13a by the user 28.

In step 304, the diagnostic client 40 may send information related to mobile station 13a from mobile station 13a to diagnostic server 31. Such information can include, but is not limited to, MDN, MEID, International Mobile Equipment Identity (IMEI), International Mobile Subscriber Identity (IMSI), Integrated Circuit Card Identifier (ICCID), manufacturer name, device mode, application version(s) and an operating system version. The information associated with the mobile station 13a may be stored at a database of the diagnostic server 31.

In step 306, responsive to step 304, diagnostic client 40 receives a registration confirmation from diagnostic server 31 and the diagnostic client 40 saves a flag (e.g., success flag/memory bit) in a memory of mobile station 13a. Because the flag has been set by the diagnostic client 40, the diagnostic client 40 may not attempt to register mobile station 13a again with diagnostic server 31. In some implementations, the diagnostic client 40 may attempt to register mobile station 13a again with diagnostic server 31 if the diagnostic client 40 determines that the mobile station's 13a Subscriber Identification Module (SIM) card has been changed or the operating system of the mobile station 13a has been updated. When the mobile station's 13a Subscriber Identification Module (SIM) card has been changed or the operating system of the mobile station 13a has been updated, the flag associated with a previous registration confirmation may be reset. Because the diagnostic client 40 checks the status of the flag to determine whether the flag is set or reset prior to registration, when the flag is reset the diagnostic client proceeds to register mobile station 13a again with diagnostic server 31.

FIG. 4 illustrates an exemplary flow diagram for establishment of a secure communication connection between the mobile station 13a with the diagnostic server 31.

In step 402, a messaging service message (e.g., a WAP push message) is sent from diagnostic server 31 to initiate (or "wake-up") the diagnostic client application 40. As an example, such a message may be sent when the user 28 initiates an IVR session with a customer service line of a wireless network provider or may be initiated upon request of customer service agent 38 via customer service client 36. In some implementations, when the user dials into an IVR number using the mobile station 13a, an IVR session is initialized and an IVR system of the wireless network provider sends a notification to the diagnostics server 31 that an IVR session has been initialized. In this way, the diagnostics server 31 detects initialization of an interactive voice response (IVR) session between the mobile device and a customer service line operated by a wireless network provider of the mobile device. Then, responsive to the notification, the diagnostic server 31 sends the messaging service message to initiate the diagnostic client 40. When the IVR session is terminated (e.g., when a user disconnects an IVR call), the IVR system of the wireless network provider may send another notification to the diagnostics server 31 indicating that the IVR session has been terminated.

In step 404, the initiated diagnostic client 40 communicates with the diagnostic server 31 and the diagnostic server 31 establishes a secure connection with the mobile station 13a via the diagnostic client 40. As an example, the secure connection can be a persistent connection. The persistent connection may use a Secure Socket Layer (SSL) or an Internet Engineering Task Force (IETF) Transport Layer Security (TLS) protocol. Also, for example, the persistent connection can be established on any type of mobile station 13a regardless of the manufacturer or an operating system version. The data may be transmitted over the persistent connection using Hypertext Transfer Protocol (HTTP) 1.1 chunked transfer encoding. An HTTP persistent connection, also called HTTP keep-alive, or HTTP connection reuse, can include using a single Transfer Control Protocol (TCP) connection to send and receive multiple HTTP requests/responses, as opposed to opening a new connection for every single request/response pair.

Chunked transfer encoding is a data transfer mechanism of HTTP in which data can be sent in a series of "chunks." Chunked transfer encoding uses a Transfer-Encoding HTTP header in place of a Content-Length header, which an earlier version of the HTTP protocol would otherwise require. Because the Content-Length header is not used, the sender (e.g., diagnostic server 31) does not need to know the length of the content before it starts transmitting a response to the receiver. Senders can begin transmitting dynamically-generated content before knowing the total size of that content. The size of each chunk is sent right before the chunk itself so that the receiver (e.g., mobile station 13a) can tell when it has finished receiving data for that chunk. The data transfer is terminated by a final chunk of length zero. The disclosed implementations allow for a plurality of diagnostic commands to be sent from the diagnostic server 31 using the same existing persistent connection instead of establishing separate connections between mobile station 13a and diagnostic server 31 for each command sent from diagnostic server 31. This reduces use of communication bandwidth and also reduces time taken to send and receive diagnostic data 50 from mobile station 13a. As a result, customer issues can be resolved efficiently.

Returning to process 400, in step 406, the diagnostic client 40 can receive diagnostic commands from the diagnostic server 31. As an example, the diagnostic server 31 may provide commands upon receiving instruction(s) from customer service client 36. As an example, commands sent to the diagnostic client 40 and the corresponding data sent back can include, but are not limited to:

Standard Diagnostics Data, which may include Network, Wi-Fi, Battery, Memory, Storage, Bluetooth, OS, SIM parameters and other data for mobile station 13a.

Application Diagnostics Data, which may include a name, package name, version and last update time for all installed applications on mobile station 13a.

Processes Diagnostics Data, which may include all identifiers or names of running processes and related information such as CPU usage, resident set size, virtual set size, a number of threads and state etc. for mobile station 13a.

In step 408, the diagnostic client 40 sends the diagnostic data 50 (e.g., Standard Diagnostics Data, Application Diagnostics Data and Processes Diagnostics Data) from mobile station 13a to diagnostic server 31 using the secure connection established in step 404.

In some implementations, diagnostic server 31 may prefetch diagnostic data 50 during an IVR session between the user 28 and a customer service support line of a wireless network provider associated with mobile station 13a. For example, referring to the process illustrated in FIG. 3, steps 302 to 306 can be performed when user 28 calls a customer service line of a wireless network provider associated with mobile station 13a. In this way, device diagnostics data 50 can be pre-fetched and be ready for viewing by customer service agent 38 when the user 328 eventually connects to the customer service agent 38 during the IVR session. This reduces time needed to service a user 28 and improves the user's 28 customer service experience.

In some implementations, all data, including diagnostics data 50, that is received from the mobile station 13a can be stored in a database of server 31. In some implementations, the customer service agent 38 can use a refresh feature provided in an interface of the customer service client 36 to send a new command to the mobile station 13a and fetch new diagnostics data from mobile station 13a. The refresh feature may be provided in the form of a refresh button displayed on the customer service client 36. The refresh button may be selected at any time by the customer service agent 36 but may be more useful when the customer service agent 38 has been unable to view the customer service client 36 for a longer than normal period of time. In this scenario, the refresh feature offers a convenient way to send a new command to the mobile station 13a and fetch new diagnostics data from mobile station 13a. The customer service agent 38 may also be able to view a history of previously fetched diagnostics data via the customer service client 36.

Figure 5A:
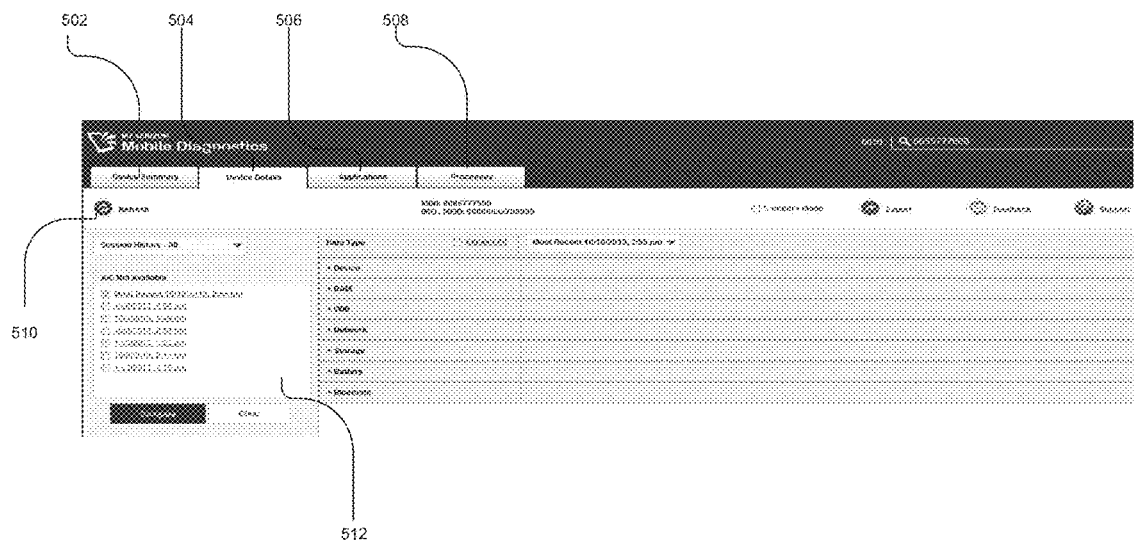
FIG. 5A illustrates an exemplary user interface of a customer service client.

FIG. 5A illustrates an example user interface 500 of the customer service client 36. The customer service client 36 includes a device summary tab 502, a device details tab 504, an applications tab 504 and a processes tab 506. Interface 500 also includes a session history 508 and a refresh button 510. In some implementations, the customer service agent 38 can browse the device diagnostics data 50 in various categories via user interface 500 and can compare newly fetched device diagnostics data with old diagnostics data retrieved from the mobile station 13a. This helps the customer service agent 38 visualize a difference between two or more distinct diagnostic sessions with the mobile station 13a and resolve potential issues of the mobile station 13a. The user interface 500 can also proactively identify possible issues at mobile station 13a by comparing parameters associated with the issues to a pre-defined set of rules. Then, based on the comparison, the user interface 500 visually highlights the issues to gain attention of the customer service agent 38. For example, if a battery level of the mobile station 13a is low or the RAM usage of the mobile station 13a is extremely high, the user interface 13a provides such information to the customer service agent 38. FIG. 5B illustrates an exemplary interface where a device related issue is highlighted. Particularly, FIG. 5B illustrates an exemplary interface 520 where a low battery situation is highlighted.

In some cases, different customer service agents in working for a wireless service provider may have different data access privileges. Such data access privileges may be based on customer service roles assigned to a customer service agent. In some implementations, the customer service client 38 and the user interface 500 can provide for role-based access to the diagnostics data 50. Furthermore, features displayed on the user interface 400 can be controlled based on a role assigned to a customer service agent. For example, the customer service agent 38 may be allowed to view historic diagnostic data stored at diagnostic server 31 but may be proscribed from requesting new diagnostic data from mobile station 13a.

FIG. 6 illustrates exemplary permissions associated with different customer service roles according to some implementations. Row 602 illustrates different "Basic Read Only Permissions." Row 604 illustrates "Complete Diagnostic/No MDN Search" permissions. Row 606 illustrates permissions that enable the customer service agent 38 to "Search Diagnostic History" and Row 608 illustrates "Full Access" to all diagnostic features and data.

Figure 7:
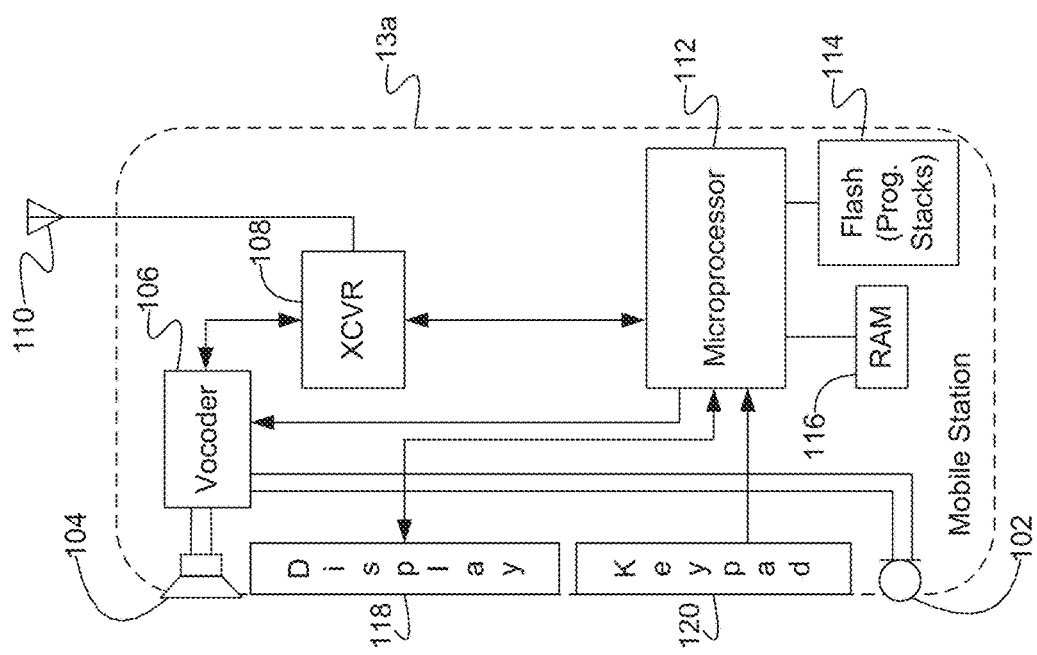
FIG. 7 is a high-level functional block diagram of an exemplary non-touch type mobile station as may utilize the remote diagnostics service through a network/system like that shown in FIG. 1.

For purposes of such a discussion, FIG. 7 provides a block diagram illustration of an exemplary non-touch type mobile station 13a. Although the mobile station 13a may be a smart-phone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc., including the diagnostics client 40 for the remote diagnostics service. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during remote diagnostics.

A microprocessor 112 serves as a programmable controller for the mobile station 13a, in that it controls all operations of the mobile station 13a in accord with programming that it executes, for all normal operations, and for operations involved in the remote diagnostics procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for providing remote diagnostics.

Figure 8:
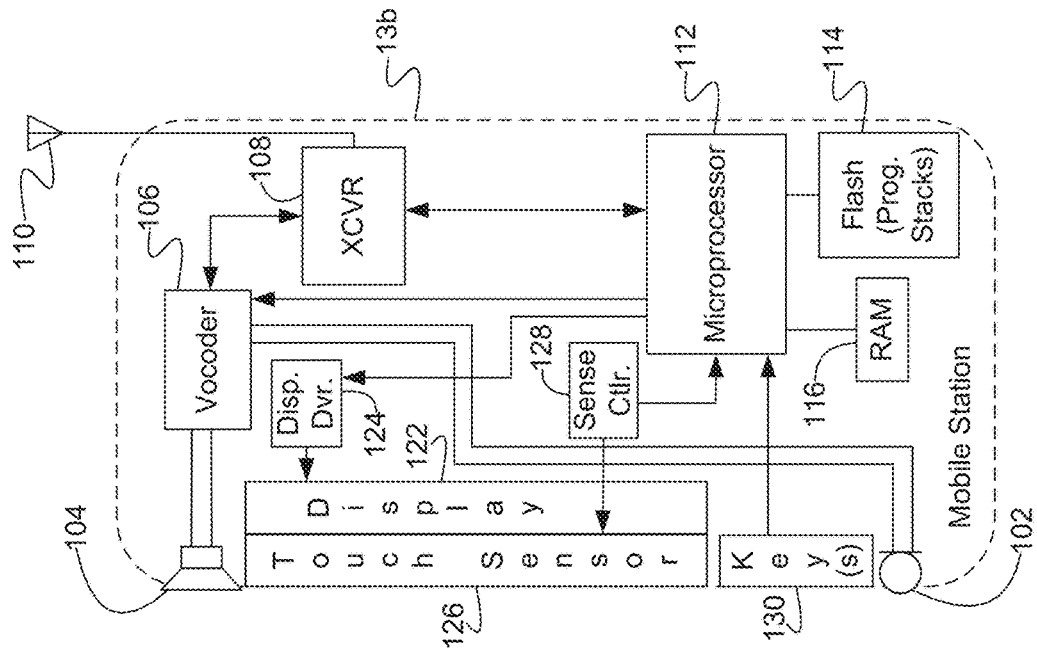
FIG. 8 is a high-level functional block diagram of an exemplary touch screen type mobile station as may utilize the remote diagnostics service through a network/system like that shown in FIG. 1.

For purposes of such a discussion, FIG. 8 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 8. For example, the touch screen type mobile station 13b includes a microphone 102, speaker 104 and vocoder 106, for audio input and output functions, much like in the earlier example. The mobile station 13b also includes at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the remote diagnostics procedure under consideration here. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming stored in the flash memory 114 configures the processor so that the mobile station is capable of performing various desired functions, including in this case the functions involved in the technique for providing remote diagnostics.

In the example of FIG. 7, the user interface elements included a display and a keypad. The mobile station 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output, including with respect to some remote diagnostics related functions.

The structure and operation of the mobile stations 13a and 13b, as outlined above, were described by way of example, only.

As shown by the above discussion, functions relating to the enhanced user experience for the remote diagnostics service, via a graphical user interface of a mobile station may be implemented on computers connected for data communication via the components of a packet data network, operating as a mobile station 13a as shown in FIG. 1. Although special purpose devices may be used, such devices also may be implemented using one or more hardware platforms intended to represent a general class of data processing device commonly used to run "server" programming so as to implement the remote diagnostics functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for remote diagnostics. The software code is executable by the general-purpose computer that functions as the diagnostics server 31 and/or customer service client 36 that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for remote diagnostics, in essentially the manner performed in the implementations discussed and illustrated herein.

Figure 9:
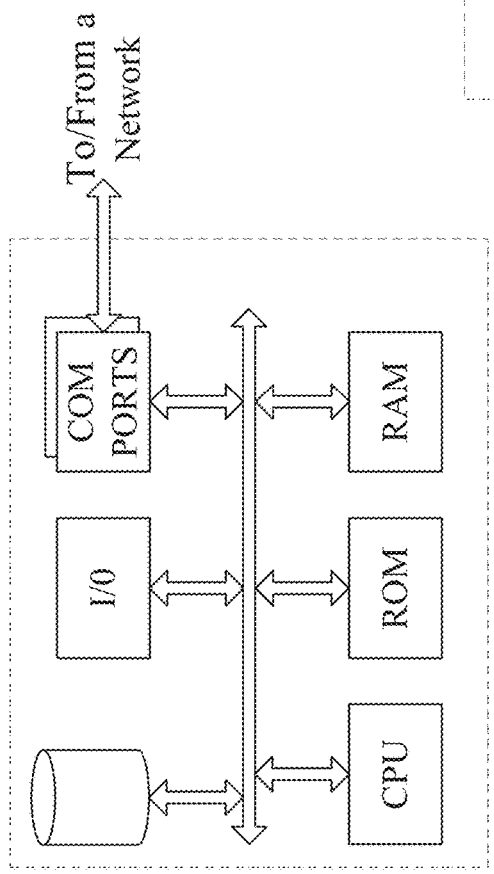
FIG. 9 is a simplified functional block diagram of a computer that may be configured as a host or server, for example, to function as the diagnostics server in the system of FIG. 1.
Figure 10:
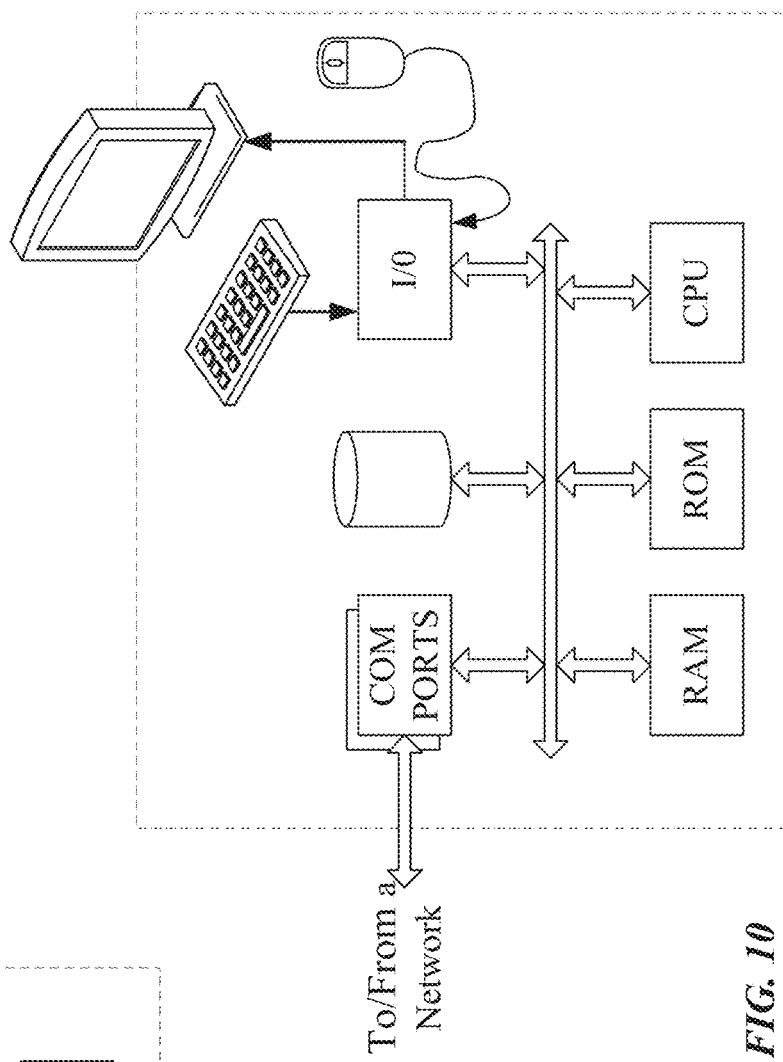
FIG. 10 is a simplified functional block diagram of a personal computer or other work station or terminal device.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of remote diagnostics outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the wireless network provider into the computer platform of the remote diagnostics that will be the diagnostics server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement remote diagnostics, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, a request for a device diagnostic session from a mobile device, at a server, wherein the request is provided to address a customer service need associated with the mobile device;
   providing, in response to the request, a messaging service message from the server to the mobile device, the messaging service message including an authentication token, wherein receipt of the messaging service message at the mobile device causes initialization of a diagnostic client at the mobile device;
   providing one or more diagnostic commands to the diagnostic client from the server via a secure connection, the secure connection established between the server and the diagnostic client for the device diagnostic session, the secure connection established when the diagnostic client authenticates the authentication token included in the received messaging service message, wherein the one or more diagnostic commands are transmitted by the server using chunked transfer encoding;
   receiving one or more device diagnostics at the server from the initialized diagnostic client via the established secure connection, the device diagnostics including at least one of device hardware status, device application status or device process status;
   providing the received device diagnostics for display to a customer service agent servicing the customer service need associated with the mobile device during the device diagnostic session
   providing one or more additional diagnostic commands to retrieve updated device diagnostics from the mobile device;
   providing the updated device diagnostics for display to the customer service agent servicing the customer service need associated with the mobile device during the device diagnostic session; and
   providing an indication of changes between the updated diagnostics and the received diagnostics.

2. The method of claim 1, further comprising:
   receiving the device diagnostics during an interactive voice response (IVR) session between the mobile device and a customer service line operated by a wireless network provider of the mobile device; and
   providing the received device diagnostics for display to allow the customer service agent to view the device diagnostics prior to initiating a conversation with a user of the mobile device in response to initialization of the IVR session.

3. The method of claim 1, wherein the secure connection comprises a persistent push connection.

4. The method of claim 3, wherein the persistent push connection is a Hypertext Transfer Protocol Secure Socket Layer connection.

5. The method of claim 1, wherein the received device diagnostics are stored at a database at the server.

6. The method of claim 1, further comprising:
   retrieving historic diagnostics associated with the mobile device, the historic diagnostics stored during one or more previous diagnostic sessions between the mobile device and the server; and
   providing the historic diagnostics associated with the mobile device to the customer service agent servicing the customer service need associated with the mobile device during the device diagnostic session.

7. The method of claim 1, further comprising:
   categorizing the device diagnostics into one or more categories based on whether the device diagnostics are hardware diagnostics, application diagnostics or process diagnostics; and
   providing the categorized diagnostics for display to the customer service agent.

8. The method of claim 1, further comprising:
   comparing the received device diagnostics to one or more predefined diagnostics;
   determining a deviation between the received device diagnostics and the predefined device diagnostics; and
   providing an indication of the determined deviation between the received device diagnostics and the predefined device diagnostics to the customer service agent.

9. The method of claim 1, further comprising:
   identifying a privilege level of the customer service agent, the privilege level indicating a level of access to the received device diagnostics; and
   providing access to the received device diagnostics and historic data based on the identified privilege level.

10. A server, comprising:
    a communication interface configured to enable communication via a mobile network;
    a processor coupled with the communication interface;
    a storage device accessible to the processor; and an executable program in the storage device, wherein execution of the program by the processor configures the server to:

receive, from a mobile device and at the server, a request for a device diagnostic session, wherein the request is received to service a customer service need of a user of the mobile device;

provide, in response to the request, a messaging service message to the mobile device, the messaging service message including an authentication token, wherein receipt of the messaging service message at the mobile device causes initialization of a diagnostic client at the mobile device;

provide one or more diagnostic commands to the diagnostic client via a secure connection to retrieve device diagnostics of the mobile device, the secure connection established by the diagnostic client between the server and the diagnostic client for a device diagnostic session, the secure connection established when the diagnostic client authenticates the authentication token included in the received messaging service message, wherein the one or more diagnostic commands are provided to the diagnostic client using chunked transfer encoding;

receive the device diagnostics from the initialized diagnostic client via the established secure connection, the device diagnostics including at least one of device hardware status, device application status or device process status;

provide the received diagnostics for display to a customer service agent servicing the customer service need of the user during the device diagnostic session;

provide one or more additional diagnostic commands to retrieve updated device diagnostics from the mobile device;

provide the updated device diagnostics for display to the customer service agent servicing the customer service need of the user during the device diagnostic session; and provide an indication of changes between the updated diagnostics and the received diagnostics.

11. The server of claim 10, wherein further execution of the program by the processor configures the server to:

receive the device diagnostics during an interactive voice response (IVR) session between the mobile device and a customer service line operated by a wireless network provider of the mobile device; and provide the received device diagnostics for display to allow the customer service agent to view the device diagnostics prior to initiating a conversation with the user in response to initialization of the IVR session.

12. The server of claim 10, wherein further execution of the program by the processor configures the server to:

store the received device diagnostics in a database at the server.

13. The server of claim 10, wherein further execution of the program by the processor configures the server to:

retrieve historic diagnostics associated with the mobile device, the historic diagnostics stored during one or more previous diagnostic sessions between the mobile device and the server; and provide the historic diagnostics associated with the mobile device to the customer service agent servicing the customer service need of the user during the device diagnostic session.

14. The server of claim 10, wherein further execution of the program by the processor configures the server to:

categorize the device diagnostics into one or more categories based on whether the diagnostics are hardware diagnostics, application diagnostics or process diagnostics; and provide the categorized diagnostics for display to the customer service agent.

15. The server of claim 10, wherein further execution of the program by the processor configures the server to:

compare the received device diagnostics to one or more predefined diagnostics;

determine a deviation between the received device diagnostics and the predefined device diagnostics; and provide an indication of the determined deviation between the received device diagnostics and the predefined device diagnostics to the customer service agent.

16. The server of claim 10, wherein further execution of the program by the processor configures the server to:

identify a privilege level of the customer service agent, the privilege level indicating a level of access to the received device diagnostics; and provide access to the received device diagnostics and historic data based on the identified privilege level.

17. The server of claim 10, wherein the messaging service message is a WAP push message.

18. A non-transitory computer-readable medium comprising instructions which, when executed by one or more computers, cause the one or more computers to:

receive, from a mobile device and at a server, a request for a device diagnostic session, wherein the request is received to service a customer service need of a user of the mobile device;

provide, in response to the request, a messaging service message to the mobile device, the messaging service message including an authentication token, wherein receipt of the messaging service message at the mobile device causes initialization of a diagnostic client at the mobile device;

provide, from the server, one or more diagnostic commands to the diagnostic client via a secure connection to retrieve device diagnostics of the mobile device, the secure connection established by the diagnostic client between the server and the diagnostic client for a device diagnostic session, the secure connection established when the diagnostic client authenticates the authentication token included in the received messaging service message, wherein the one or more diagnostic commands are provided to the diagnostic client using chunked transfer encoding;

receive the device diagnostics at the server from the initialized diagnostic client via the established secure connection, the device diagnostics including at least one of device hardware status, device application status or device process status; and provide the received diagnostics for display to a customer service agent servicing the customer service need of the user during the device diagnostic session provide one or more additional diagnostic commands to retrieve updated device diagnostics of the mobile device;

provide the updated device diagnostics for display to the customer service agent servicing the customer service need of the user during the device diagnostic session; and provide an indication of changes between the updated diagnostics and the received diagnostics.

19. The non-transitory computer-readable medium of claim 18, further comprising instructions which, when executed by one or more computers, cause the one or more computers to:
  receive the device diagnostics during an interactive voice response (IVR) session between the mobile device and a customer service line operated by a wireless network provider of the mobile device; and
  provide the received device diagnostics for display to allow the customer service agent to view the device diagnostics prior to initiating a conversation with the user subsequent to the IVR session.

20. The non-transitory computer-readable medium of claim 18, further comprising instructions which, when executed by one or more computers, cause the one or more computers to:
  store the received device diagnostics in a database at the server.

\* \* \* \* \*